United States Patent [19]

Baxter, Jr.

[11] 3,872,266

[45] Mar. 18, 1975

[54] TELEPHONE MONITOR CIRCUIT

[75] Inventor: Vernon A. Baxter, Jr., Golden Valley, Minn.

[73] Assignee: Magnetic Controls Company, Minneapolis, Minn.

[22] Filed: Dec. 13, 1973

[21] Appl. No.: 424,367

[52] U.S. Cl. .......... 179/175.2 C, 179/1 H, 179/81 A

[51] Int. Cl. .......... H04m 3/22

[58] Field of Search ...... 179/175.2 C, 175.1 R, 175, 179/81 A, 1 H, 1 HF

[56] References Cited

UNITED STATES PATENTS

| | | | |
|---|---|---|---|
| 2,131,578 | 9/1938 | Bachelet et al. | 179/175.2 C |
| 3,387,096 | 6/1968 | Grandstaff et al. | 179/81 A |
| 3,453,394 | 7/1969 | Linse | 179/81 A |

*Primary Examiner*—Kathleen H. Claffy
*Assistant Examiner*—Douglas W. Olms
*Attorney, Agent, or Firm*—Neil B. Schulte

[57] ABSTRACT

A circuit for listening to and talking on a four wire telephone circuit to monitor the condition thereof in which amplification is achieved in both directions without the use of separate wires by utilizing a phase shifted automatic cancelling circuit to prevent uncontrolled feedback but still provide a limited side tone feedback.

4 Claims, 1 Drawing Figure

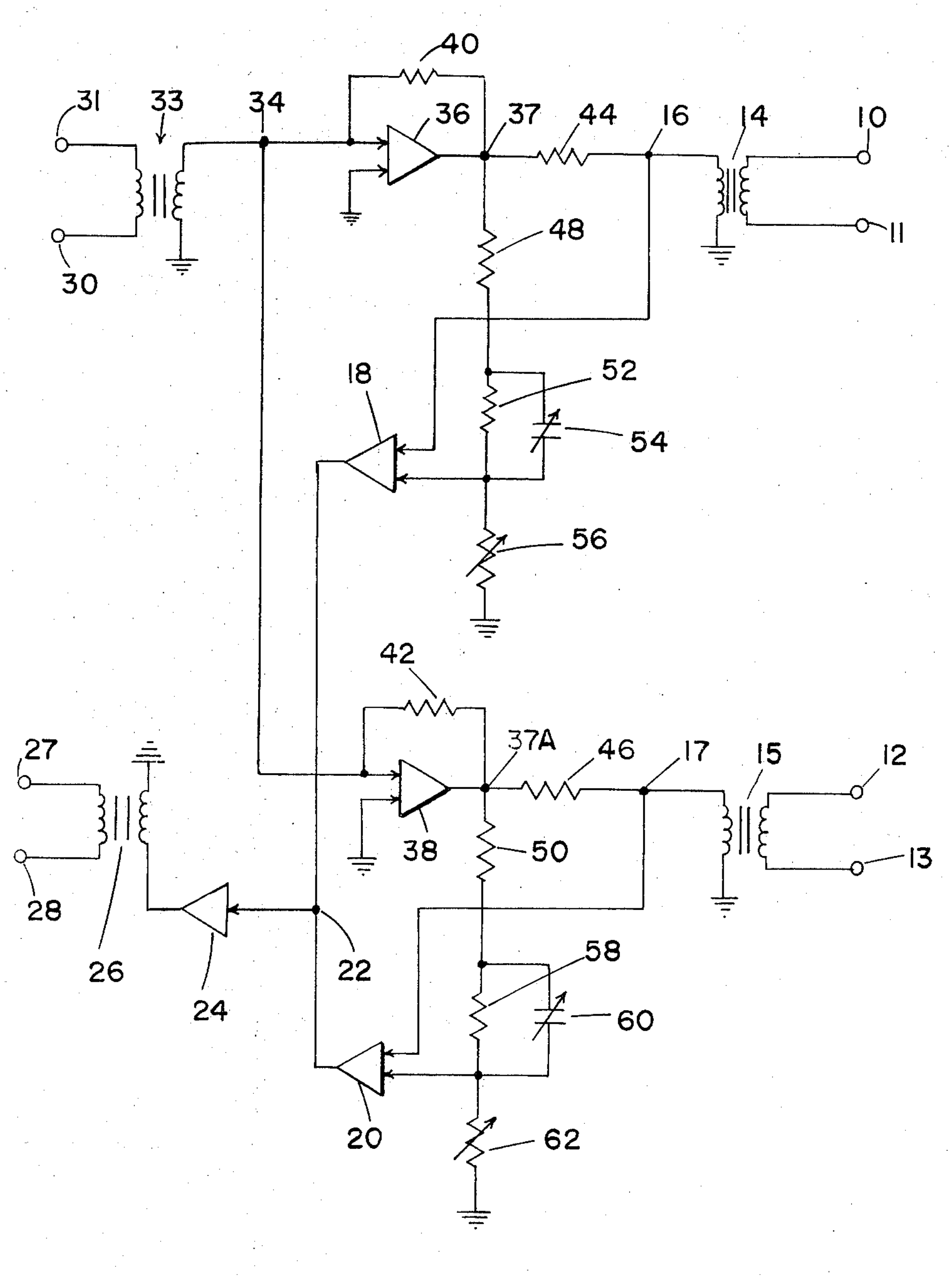
40
31
33
34
36
37
44
16
14
10
11
30
48
52
18
54
56
42
37A
46
17
15
12
27
38
50
13
28
26
24
22
58
60
20
62

TELEPHONE MONITOR CIRCUIT

BACKGROUND OF THE INVENTION

In the prior art it is known to monitor or test four wire telephone systems by bridging across the lines with a suitable monitoring circuit. Typically, this circuit utilizes a relatively high bridging impedance so that the lines are not unnecessarily loaded down which loading would affect the normal operation of the lines. It is possible, with these bridging monitors, to both listen and talk to either or both ends of the lines and to another bridging monitor at some other location along the lines being tested. Since the tests involve both transmission and reception it is desirable to provide amplification in both directions to overcome the coupling losses. In the prior art, the transmitting and receiving lines are isolated from each other by means of specialized magnetic transformers which prevent feedback loops from forming which loops cause howling in the circuit.

A limited amount of feedback is permitted to provide what is known in the prior art as a side tone. A side tone is a controlled amount of voice energy feedback so that one talking on the line can hear his own voice to a limited degree. This serves the function of causing the person talking to maintain his voice level at a predetermined loudness appropriate to the equipment being used. With no feedback at all the tendency is to talk much too loud in order to hear oneself speak. On the other hand if too much feedback is present the person talking tends to talk too softly and not create enough volume to be properly heard. The prior art magnetic transformers provide just enough feedback to accomplish the desired side tone level.

The problem with the prior art approach is that the specialized magnetic transformers are more expensive and must be tailored to each application. My invention accomplishes the two way amplification with electronic components as described hereinafter.

SUMMARY OF THE INVENTION

Briefly, my invention contemplates the use of two standard electronic amplifiers one feeding into a coupling transformer for transmitting and the other receiving from the same coupling transformer for receiving. In order to prevent uncontrolled amplification of the transmission signal, a portion of the transmission signal is divided out from the circuit, appropriately phase shifted, and fed back to the receiving amplifier 180° out of phase with the original signal. Thus, when one is talking on the line a majority of the signal is cancelled out of the listening circuit providing only a limited feedback and an appropriate side tone level. It may therefore be seen that it is an object of my invention to provide a lower cost and improved telephone line monitoring circuit. It is a further object of my invention to provide such a circuit which has greater flexibility in that a wider range of frequencies and volume levels may be accommodated. This is true because the specialized magnetic transformers used by the prior art must be designed for specific line levels and if a different level is used an entirely new and expensive transformer must be used. Further objects and advantages will become apparent from the following description and drawings.

BRIEF DESCRIPTION OF THE DRAWING

The drawing shows a schematic diagram of the circuit of my invention as applied to a four wire telephone system.

DESCRIPTION OF THE PREFERRED EMBODIMENT

In the drawing a schematic diagram is presented showing one preferred embodiment of the invention wherein a monitor circuit for a four wire telephone line is provided. In the embodiment shown it is possible to listen and talk on both pairs of wires at the same time. It should be obvious to one skilled in the art, however, that either one or the other pair of wires could be tested individually by a suitable switching arrangement well known to those skilled in the art.

Connections are made to the four wires of the telephone circuit by any suitable connector shown schematically in the drawing by means of terminals 10, 11, 12 and 13. One pair of lines comprise the connections to terminals 10 and 11 whereas the other pair of lines comprise the connections to terminals 12 and 13. Either pair may be designated to transmit or receive. To prevent loading down the telephone circuit a suitable coupling transformer 14 is used to transfer signals to and from terminals 10 and 11. A similar transformer 15 is utilized with terminals 12 and 13. Coupling transformers 14 and 15 are designed to have an apparent impedance of approximately 600 ohms on the telephone side of the circuit and 10,000 ohms on the monitoring circuit side of the windings. These values, of course, may vary but are typical of those being utilized in the telephone industry. Since either pair of wires may be used to transmit or receive, talking circuits and listening circuits are provided for each pair. If a signal is received through coupling transformers 14 and 15 it is detected at points 16 and 17 and directed to amplifiers 18 and 20. The output from amplifiers 18 and 20 is summed at point 22 and amplified by an amplifier 24 and presented through a coupling transformer 26 to terminals 27 and 28. Suitable earphones or other listening devices may be connected at terminals 27 and 28. In this way any transmissions on the telephone wires may be monitored.

In order to talk or transmit on the wires a suitable microphone or other signal is impressed on terminals 30 and 31. The signal is coupled in through a suitable coupling transformer 33 to a point 34. From there the signal is presented to a pair of transmitting amplifiers 36 and 38. The gains of amplifiers 36 and 38 are controlled by suitable resistances 40 and 42 in a manner well known to those skilled in the art. The output from amplifier 36 is coupled into the lines through a resistor 44 and coupling transformer 14. The output from amplifier 38 is coupled into the lines through transformer 15 and a resistor 46.

In normal operations it is anticipated that the monitor circuit will permit talking on the connection to terminals 30 and 31 while listening on the terminals 27 and 28. Thus, it is desirable to have some feedback so that the transmitting person may hear his own voice. As discussed before this side tone permits the person transmitting to control the level of his own voice according to the amount of feedback he hears. As the signals from amplifiers 36 and 38 are transmitted out, however, they are already amplified and then transmitted back through amplifiers 18, 20 and 24 so that the overall amplification is extremely large. To prevent this the outputs from amplifiers 36 and 38 are directed through resistors 48 and 50 to a pair of phase lead networks which comprise, in the case of amplifier 18, a resistor 52, a variable capacitor 54 and a trimming resistor 56. In the case of amplifier 20 the phase lead network comprises a resistor 58, a variable capacitor 60 and a variable resistor 62. Both phase lead networks operate in the same manner and, thus, the operation is described only with respect to feedback amplifier 18. By adjusting capacitor 54 to the proper capacitance a wide variety of frequency ranges may be accomodated with the phase lead network. A phase lead network is made necessary by the fact that some phase change occurs as a result of coupling transformer 14. The network formed by resistor 52 and capacitor 54 enables this change to be matched exactly so that the signal can be presented to the second input of amplifier 18, 180° out of phase with the input from point 16. Thus, the signal transmitted by amplifier 36 is almost totally cancelled at amplifier 18. The amount of cancellation is adjusted by variable resistor 56 so that a proper side tone level is maintained.

Cancellation does not take place when the signal is being received from terminals 10 and 11. This is true because the voltage at points 37 and 37A can only be changed by amplifiers 36 and 38. Any incoming signal from coupling transformers 14 and 15 is effectively nullified by the feedback gain controlling resistors 40 and 42. That is to say, amplifiers 36 and 38 prevent any voltage signal from being developed at points 37 and 37A unless the signal is presented from the input side of amplifiers 36 and 38. Consequently, it may be seen that circuits are provided that allow amplification in two directions with a wide adaptability to different frequencies and different side tone levels without the necessity of a specific magnetic transformer designed for each application.

I claim:

1. An electronic circuit for monitoring information carrying electrical lines with transmission and reception amplification comprising:

a first amplifying means having first and second opposite phased inputs;

a first coupling transformer between the information carrying lines and the first input to said first amplifying means;

listening means connected to the output of said first amplifying means;

a second amplifying means with the input adapted to accept a transmission signal and the output connected through a resistance to said first coupling transformer; and phase shifting means connected between the output of said second amplifying means and the second input to said first amplifying means so as to partially cancel out the signal from said second amplifying means fed back to the first amplifying means from the first coupling transformer.

2. The circuit of claim 1 including another first and second amplifying means connected together in the same manner as the amplifying means of claim 1 with another phase shifting means connected therebetween, and a second coupling transformer connected thereto so as to monitor additional information carrying lines, both of said first amplifying means having their outputs combined and connected to the listening means and both of said second amplifying means having their inputs connected together.

3. The apparatus of claim 1 in which said phase shifting means includes an adjustable capacitance and an adjustable resistance.

4. The apparatus of claim 2 in which both said phase shifting means include an adjustable capacitance and an adjustable resistance.

* * * * *